US007719543B2

(12) United States Patent
Jabri et al.

(10) Patent No.: US 7,719,543 B2
(45) Date of Patent: May 18, 2010

(54) METHODS AND APPARATUS FOR METHOD TO OPTIMIZE VISUAL CONSISTENCY OF IMAGES USING HUMAN OBSERVER FEEDBACK

(75) Inventors: Kadri Nizar Jabri, Waukesha, WI (US); Gopal B. Avinash, New Berlin, WI (US); Chaitanya Yashwant Deodhar, Chicago, IL (US)

(73) Assignee: General Electric Company, Schenectady, NY (US)

( * ) Notice: Subject to any disclaimer, the term of this patent is extended or adjusted under 35 U.S.C. 154(b) by 819 days.

(21) Appl. No.: 11/222,419

(22) Filed: Sep. 8, 2005

(65) Prior Publication Data

US 2007/0052716 A1 Mar. 8, 2007

(51) Int. Cl.
*G09G 5/00* (2006.01)
*H04N 5/14* (2006.01)
*G03F 3/08* (2006.01)
*H04N 1/46* (2006.01)
*G06K 9/00* (2006.01)
*G06K 9/40* (2006.01)
*G06F 3/00* (2006.01)

(52) U.S. Cl. ............... 345/581; 345/619; 345/606; 345/643; 348/672; 358/522; 358/525; 358/537; 358/452; 382/168; 382/254; 382/274; 382/300; 715/273; 715/700; 715/764

(58) Field of Classification Search ............... 345/581, 345/582, 589, 428, 586, 606, 617–619, 643, 345/689–690; 382/162, 164, 167, 171, 173, 382/254, 274, 276, 282, 300; 358/1.1, 1.9, 358/515–520, 522, 525, 447, 537–538, 452–453; 348/500, 538, 561, 563–564, 672; 715/273, 715/275, 700, 722, 798–801
See application file for complete search history.

(56) References Cited

U.S. PATENT DOCUMENTS

| | | | | |
|---|---|---|---|---|
| 6,633,689 | B2 * | 10/2003 | Yamamoto | 382/309 |
| 6,678,703 | B2 * | 1/2004 | Rothschild et al. | 707/201 |
| 2002/0057838 | A1 * | 5/2002 | Steger | 382/197 |
| 2003/0098922 | A1 * | 5/2003 | Barkan | 348/362 |
| 2003/0107586 | A1 * | 6/2003 | Takiguchi et al. | 345/629 |
| 2005/0047655 | A1 * | 3/2005 | Luo et al. | 382/167 |
| 2005/0152587 | A1 * | 7/2005 | Sirohey et al. | 382/128 |
| 2006/0209005 | A1 * | 9/2006 | Pedram et al. | 345/102 |
| 2009/0060297 | A1 * | 3/2009 | Penn et al. | 382/128 |

\* cited by examiner

*Primary Examiner*—Wesner Sajous
(74) *Attorney, Agent, or Firm*—Peter Vogel, Esq.; William Baxter, Esq.; Michael G. Smith, Esq.

(57) ABSTRACT

Systems and methods are provided for optimizing visual consistency for a dataset of images by using observed and formulated display attributes. The formulated display attributes are derived from an analysis of a first set of images from the image repository. The formulated display attributes from the first set are combined with observer's display attributes to determine scaling factors. The optimized display attributes are then derived from the calculated scaling factors for a second set of images. In another aspect, a system and method is described where a digital image is processed in order to enhance viewing of the image on a display device in accordance to the optimized attributes associated with the observer.

19 Claims, 7 Drawing Sheets

METHODS AND APPARATUS FOR METHOD TO OPTIMIZE VISUAL CONSISTENCY OF IMAGES USING HUMAN OBSERVER FEEDBACK

FIELD OF THE INVENTION

This invention relates in general to image enhancement in digital image processing and in particular to the brightness and contrast scale rendering to improve the visibility of radiographic image.

BACKGROUND OF THE INVENTION

The growing availability of digital technology is having an impact on medical imaging practice. Image archiving and communications systems allow for digital acquisition, image processing and display for a wide variety of medical imaging modalities in a digital environment. Digital medical imaging has led to an increase in productivity for the health care professionals who need to utilize images as part of patient care. To maintain this high productivity it is important for the health professional to extract diagnostically useful information from the medical images at a digital display. Digital displays have many advantages over film such as a wide variety of tools to manipulate and process the image to enhance structures or make them more visible. Yet another advantage is the availability of tools to segment images, detect, and classify lesions and to make comparisons with previous images that can be viewed from imaging archives. Chiefly due to these tools, the radiologist now has a considerable amount of influence over the quality of the image. While overall enhancing quality assurance (QA) it has led to variability in how perception and observer performance affects the quality assurance process because a completely new array of considerations arises. There are significant variations in a general image appearance with different anatomies, views, and x-ray image acquisitions.

For a radiologist, the acquired digital x-ray image may not be always satisfactory from a diagnostic point of view. Some of the image areas may be too dark, or there may be insufficient contrast in the regions of interest. Fortunately, with digital radiography it is possible to adjust the image brightness and contrast of the image by adjusting the window level (WL) and the window width (WW) of the image. However, WL and WW adjustments need to be such that overall brightness and contrast are consistent from one image to the next for a given set of conditions. The WL and WW adjustment issue is further complicated by the fact that each user has a personal preference of the consistent appearance.

Diagnostic accuracy is certainly the major consideration, but a good quality assurance system can affect observer performance in other ways. Workflow or the amount of time the radiologist spends on an individual image can easily be regarded as a reflection of the quality assurance process. If the display is inadequate in some way, it is quite likely that the radiologist will have to compensate by taking more time to examine the image before rendering a diagnostic decision. When radiographic images are viewed with electronic displays, adjustment of window width and level is a standard practice used to improve the rendering of a region-of-interest. Adjustment of window width and level is most often done manually, most often using a mouse or track-ball, and requires substantial time and effort to obtain a desired result. Window width and level adjustment requires a skilled operator to be accomplished successfully. Further, adjusting window width and level for a region of interest often has the effect of making the remaining areas of the image sub-optimally rendered. In addition to this loss of image quality, adjusting window width and level can also cause a loss of context for the region of interest leading to some areas being under expose while other areas are overexposed.

For the reasons stated above, and for other reasons stated below which will become apparent to those skilled in the art upon reading and understanding the present specification, there is a need in the art for automating the selection of window width and window level with minimal user interaction. There is also a need in the art for electronic displays to provide consistent brightness and contrast settings for a set of images.

BRIEF DESCRIPTION OF THE INVENTION

The above-mentioned shortcomings, disadvantages and problems are addressed herein, which will be understood by reading and studying the following specification.

It is therefore an object of the present invention to provide an apparatus and method for adjusting window width and window length parameters of one or more images with minimal user interaction.

In one aspect, a method is described for optimizing visual consistency for a dataset of images by using observer and formulated display attributes. The formulated display attributes are derived from an analysis of a sample test set and a sample training set of images from the image dataset. The formulated display attributes from the training set is combined with the observer's display attributes to determine brightness and contrast adjustment (BCA). The estimated window width and window length are then derived from the calculated BCA and formulated window width and window length.

In yet another aspect, a computerized method for automatically modifying the rendering of images to meet an observer preference by selecting a scaling factor defining an observer's preference for rendered images. The images can be categorized into one or more anatomy and view, tissue thickness, imaging production site, patient attributes, processing type. Further, a unique identifier is used to associate the observer to a selected scaling factor. Once selected the scaling factor is used to map the images that are subsequently displayed in a display terminal.

In still another aspect, a computer executable medium capable of directing a processor to perform the actions of receiving display attributes from an observer about a set of images, wherein the observer manually tuned the image display attributes to make images visually consistent, further the process derives optimal set of image display attributes from the received image display attributes of the observer. The processor causing the displaying of one or more images with the derived optimal set of image display attributes on a display device.

Systems, clients, servers, methods, and computer-readable media of varying scope are described herein. In addition to the aspects and advantages described in this summary, further aspects and advantages will become apparent by reference to the drawings and by reading the detailed description that follows.

DETAILED DESCRIPTION OF THE INVENTION

In the following detailed description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

Figure 1:
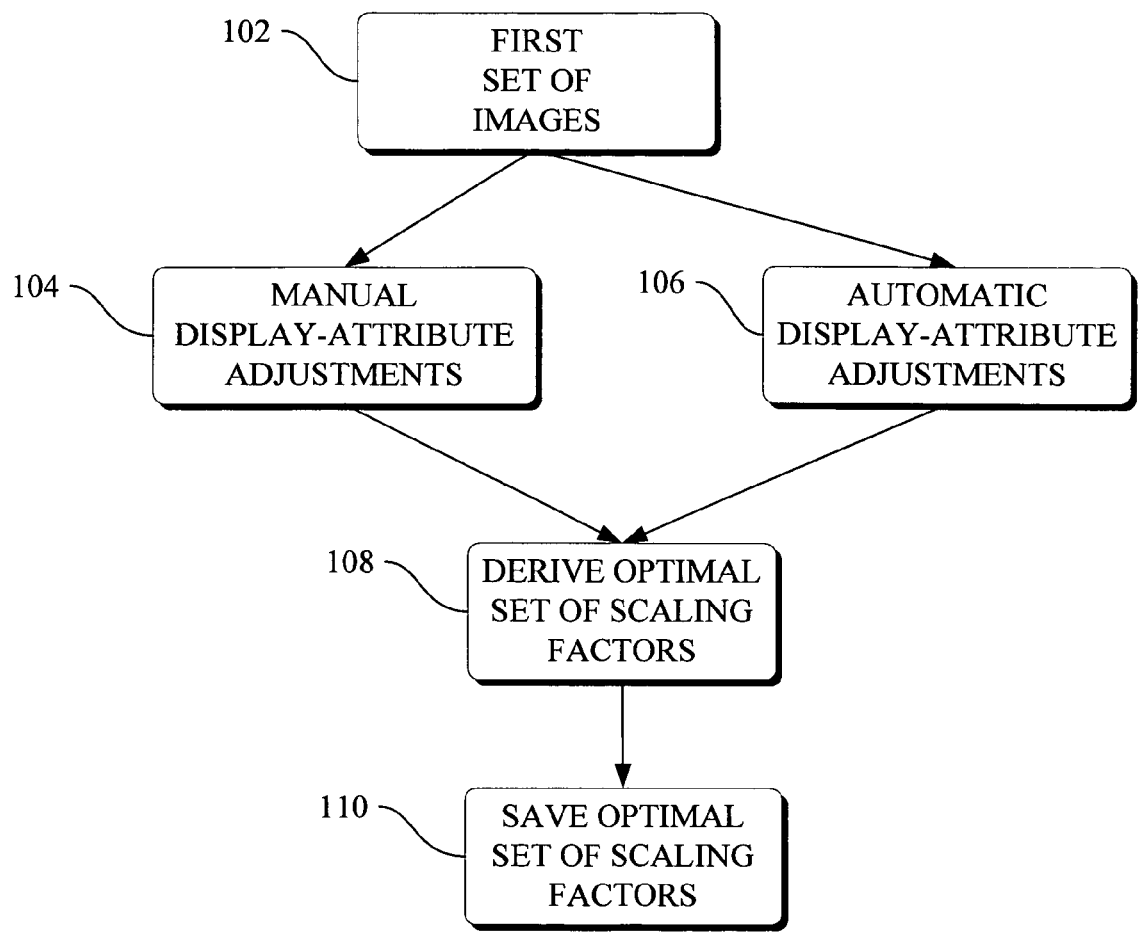
FIG. 1 is a flowchart of a method performed by a client according to an embodiment for deriving optimal set of scaling factors.

FIG. 1 is a flowchart of a method 200 performed by a client according to an embodiment. Method 100 meets the need in the art for selection of window width and window level with minimal user interaction.

Method 100 includes manual and automatic adjustments (104,106) for a set of images 102 that are combined to derive optimal set of scaling factors 108. The optimal scaling factors are optimization parameters 110 that when compiled by a suitably programmed computer (e.g., computer 402 at FIG. 4) produce a visually consistent set of images at a display terminal without the need for adjustments by the observer. Method 100 meets the need in the art for automating the selection of window width and window level with minimal user interaction Method 100 begins with action 102 by collecting of one or more images that are capable of being categorized into one or more categories for the purpose of analysis or to extract information that may lead to conclusions about the subject of the image. A possible set of categories can be based on image appearance when viewing on a display terminal. Using image appearance as a basis can produce categories such as anatomy and view, image acquisition parameters, processing type, hospital site or imaging site, anatomically relevant regions, and any other category that may be conceived to distinguish the images.

Anatomy and view is a major factor concerning the image appearance. Different body parts have different tissue thicknesses and compositions. Because of these differences incident x-ray will vary widely for each body parts leading to variations in pixel intensities for a given anatomy. For example, the images of chest and foot will inherently have a very different appearance because the tissue compositions of these body parts are quite dissimilar. Additionally, images of same anatomy vary widely in a general image appearance with different views due to different tissue thickness with changing view. A great example of how the same body part can produce inconsistent image appearance is chest lateral and chest posterior-anterior ("PA") images.

Variation in image acquisition parameters can cause a significant effect on the image appearance. Parameters such as Kilo-voltage (kVp), milliamperage-second (mAs), source image receptor ("SID"), etcetera are some of the important parameters to consider during x-ray acquisition process. Milliamperage-second (mAs) is a prime controller of radiographic image density. Since density is a function of exposure and exposure increases proportionally with increasing mAs or until a saturation point the amount of mAs controls the image density and has an effect on image consistency. Concerning the Kilovoltage (kVp) image acquisition parameters it is a major factor deciding image contrast because kVp affects beam penetrability in radiographic densities. As kVp increases, the image contrast decreases, and, as kVp decreases the image contrast increases. Kilovoltage also controls the amount of scatter radiation produced. Increasing kVp increases scatter, thereby reducing image contrast. Radiation source-to-detector distance (SID) alters the beam intensity arriving image receptor as per the inverse square law. This parameter changes the image density and contrast. Image contrast is also affected by filtering techniques such as grid. Grids remove the scatter radiation and improve image contrast. Thus, variations in these acquisition parameters have a profound change in the image appearance. Since major differences in acquisition parameters produce significantly different inherent appearances of images, even windowing will not produce a consistent appearance.

Each processing type is designed to obtain a different image look from the same raw image according to the anatomy under consideration and the observer's preference.

Each imaging facility generally has its own fixed set of acquisition parameters for each anatomy and view. It is customary for an image facility to have policies regarding prefer values for each image acquisition parameters such as mAs, kVp, SID, etcetera. The acquisition parameters vary significantly for the different hospital sites and are a significant cause of variation in image consistency. To add to this variations most radiologists prefer a certain image appearance and consequently use a certain customized processing type, which may or may not be same as the other hospital type.

The anatomically relevant regions limit image consistency to the area being studied. Consider, for the cervical spine (C-spine) images, consistency can be checked only in the relevant regions of cervical spine, the brightness (and contrast) in other regions of an image such as shoulders, skull etcetera can vary widely with each image and is irrelevant while considering a consistent image appearance.

Knowing the sources of variations of image consistency the objective is to develop a window level (W_l) and window width (W_w) estimation technique for digital radiology image so that a set of images of same anatomy and view, same processing type and acquired at the same imaging site will have a consistent image look. The technique should be able to attain a consistent look across all the images in the set rather than achieving the best look for any or all the individual images. The preferred image look varies with each observer that is each observer will have different preferences for image brightness and contrast. The goal then is to achieve a consistent look, which is clinically acceptable to the majority of observers. Secondary goal is to customize this consistent appearance to suit exact preferences of a given observer by fine-tuning of the parameters through a mapping or scaling factor.

Other categorization or further narrowing of the above categories is possible. For example, another category could be patient age and size at a broad range of patient ages and sizes, from a toddler to an octogenarian. Generally speaking, the patients from and above 18 years of age are adults; however, many pediatric patients of age over 13 years could be potentially larger than many small adult patients. One can conclude from observing a general trend that the images of patients of ages 13 years and above can be classified as adult cases and otherwise as pediatric cases. This category could be further defined as very small, small, medium, large, and very large patient size. The classification according to patient sizes can be secondary in nature and not use for the formation of image sets and analysis. However, it would be useful for developing different estimation techniques according to patient sizes if needed. Further, it enables one to identify some special cases such as very large or very small patient images, which may give considerable error in the estimation of window settings.

Knowing the sources of image inconsistencies the aim is then to develop an estimation technique for all the images of a particular image category, for example, all the images of hand PA, custom 4 processing from imaging site X, by using some sample images from that category enumerated above. To accomplish this aim the number of image sets are separated into a training set (sample set) and a corresponding test set. The training set is used for analysis, development, and selection of an estimation technique while the test set was used to verify the results. The images should be classified in such a way that both training and test sets will have cases of all patient sizes.

In action 104 one or more experts review all the images in a set and adjust the window level and window width of each image to give all the images in that particular set a consistent appearance. Action 104 may be performed at programmed imaging workstation having storage capabilities for storage of parameter settings to be used at a later point in time. Regardless of whether the parameters are acquired in real-time or at another point in time the user-defined window settings would be the desired window settings. More than one expert could be used to develop a cross spectrum of desired settings that can then be averaged or compared to develop observed settings. Notwithstanding the number of experts, the setting of the expert is considered to be the gold standard by which all techniques are judged against.

In action 108 values for $W_{\_W}$ and $W_{\_L}$ are generated by the system based on the manual and automatic display-attribute adjustments. These values are referred to as default window settings. In action 110 the derived optimal set of scaling factors are saved in memory to be used by a display terminal to change the display to the desired settings.

Figure 2:
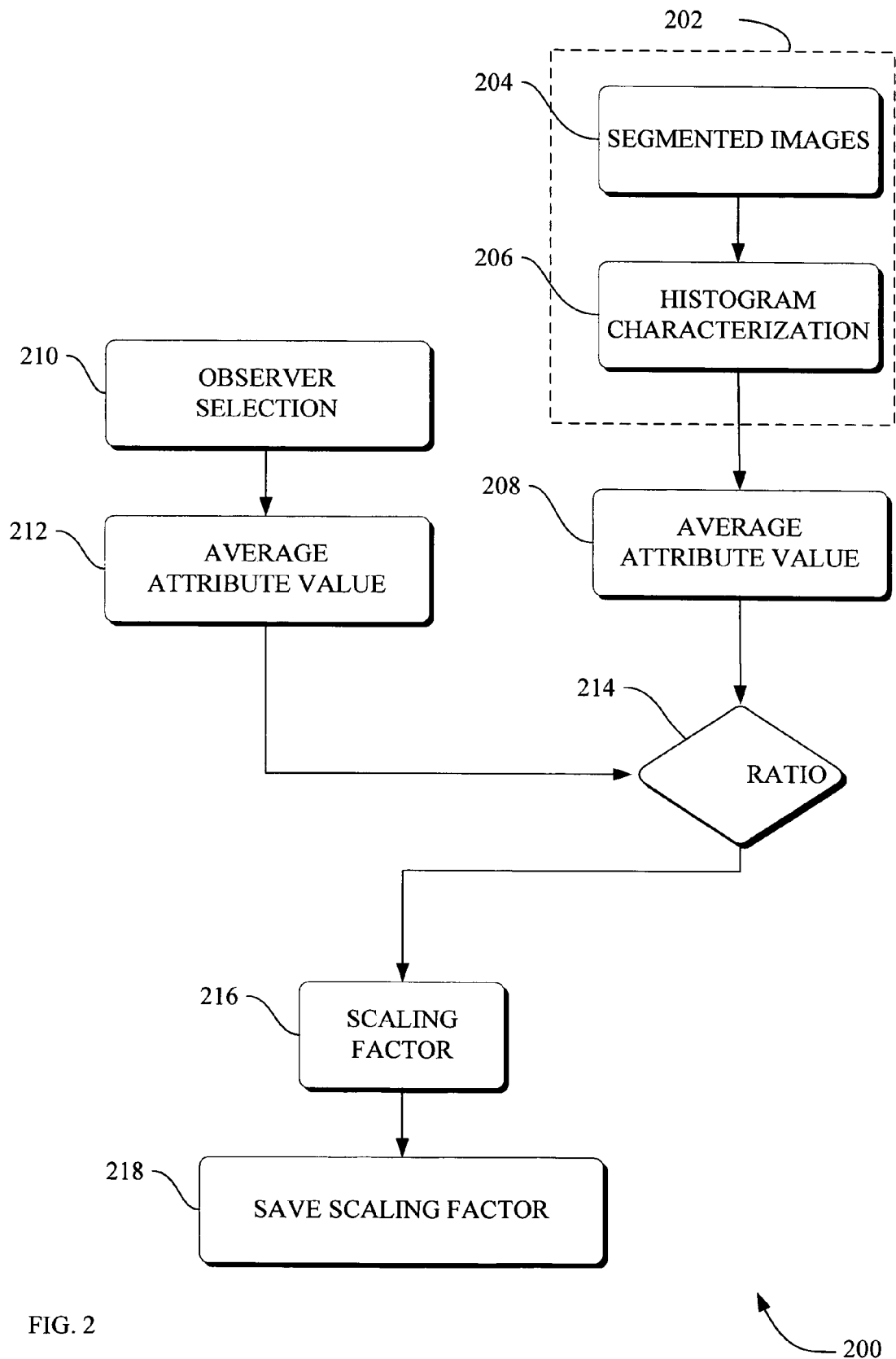
FIG. 2 is a flowchart of a method performed by a client according to an embodiment for estimating attribute value.

FIG. 2 is a flowchart of a method 200 performed by a client according to an embodiment. Method 200 meets the need in the art for selection of window width and window level with minimal user interaction.

Method 200 begins with an analysis method 202 where a set of images are segmented 204 and subjected to histogram characterization 206.

In action 204, the images are segmented. An algorithm is used to remove collimator edges & raw radiation regions from the image. An image mask is a matrix (Image) that consist of zeros (0s) and ones (1s); the image mask when combined with an image allows only selected sections of the image to be included and the non-selected section of the image to appear as a dark pattern. In the present arrangement those sections of the image that correspond to the collimator edges & raw radiation are removed by zeroing it out of the considered image. The edges are a subrange of data found in the image file that can be easily discarded by turning the individual pixels off. Once the image dataset has been segmented control passes to action 206 for further processing.

In action 206, histogram characterization is performed on the segmented images of action 204. The pixel values of the image can be a histogram to determine the range of values. The histogram displays the image data as a function of numerical pixel value. Peaks in the histogram represent values with large pixel counts or an area of uniform density. In a histogram a range of a variable is divided into class intervals (bins) for which the frequency of occurrence is represented by a rectangular column. The height of the column is proportional to the frequency of observations within the interval. Histogram characterization is the statistical measure for the pixel values of an image. In histogram characterization the interval is expressed as nth percentile values, selected from zero (0) to one hundred (100) that are incremented to percentile greater than nth by an arbitrary factor. For example, for the 60th percentile acceptable ranges would be 60-70, 60-80, 60-90, 60-100. Other possible ranges and combinations are possible. Then W_L is determined in terms of the local means of each of these ranges e.g., mean of the 10-70 range & W_W is estimated in terms of the actual difference in the higher & lower percentile values of that range for example in terms of the difference between 70th & 10th percentile values. Once histogram characterization has been performed, control passes to action 208 for further processing.

In action 208, the values for each of the segmented images are averaged. After the values have been averaged, control passes to action 214 for further processing.

In action 210, one or more observer selects attribute values for a set of images. These attribute values are one or more window width ($W_{\_W}$), window length ($W_{\_L}$) all selected by one or more observer. When the observers are done with the selection then there will be settings for each anatomy and view, processing type, and imaging site. All the images in a particular dataset e.g., Chest PA all acquired from the same site (Hospital, Medical Facility, Department within a Hospital or Medical facility) are displayed simultaneously, including all the patient sizes, both the pediatrics & adult cases. The observer adjusts the window width and window length on a display terminal to select attributes for each image in a set while viewing all the images in that particular set. These attributes adjustment should not be done to obtain the best look for individual images in the set nor for highlighting the relevant clinical details in each image; it is solely for a consistent look so that the brightness & contrast distribution of the image while being displayed is substantially uniform. This uniformity should hold at least for the anatomically relevant region. For example, cspine images consistency can be achieved and determined in the relevant anatomical region. That is the remaining portion of the cspine image such as shoulder and skull the brightness & contrast will largely vary from image to image. Thus, for each image the desired value of $W_{\_W}$ & $W_{\_L}$ as selected by the observer is used as the default value. Control then passes to action 204 for further processing.

In action 212, the observed settings in action 210 are averaged. The average describes the most typical of a full range of observed settings from the lowest to the highest. The average is inclusive of the arithmetic average describing the total of all values for each type of observed settings divided by the number of values. Those in the art also understand that average includes such statistical principles as mean, mode, and removal of outliers to describe the range of observed settings. Once the average has been determined control passes to action 214 for further processing.

In action 214, a ratio is determined between the average observed settings 212 and the average computed settings 208. The purpose if the correlation is to find the relationship between the observer settings (action 210) and the determined averaged parameters (action 208) for both the window width and window length. The ratio can be a statistical correlation such as linear regression, a relationship describing the best fit between the selected and the calculated, or it can be a ratio of the observed setting to the calculated setting. Once the ratio is determined control passes to action 216 for further processing.

Figure 7:
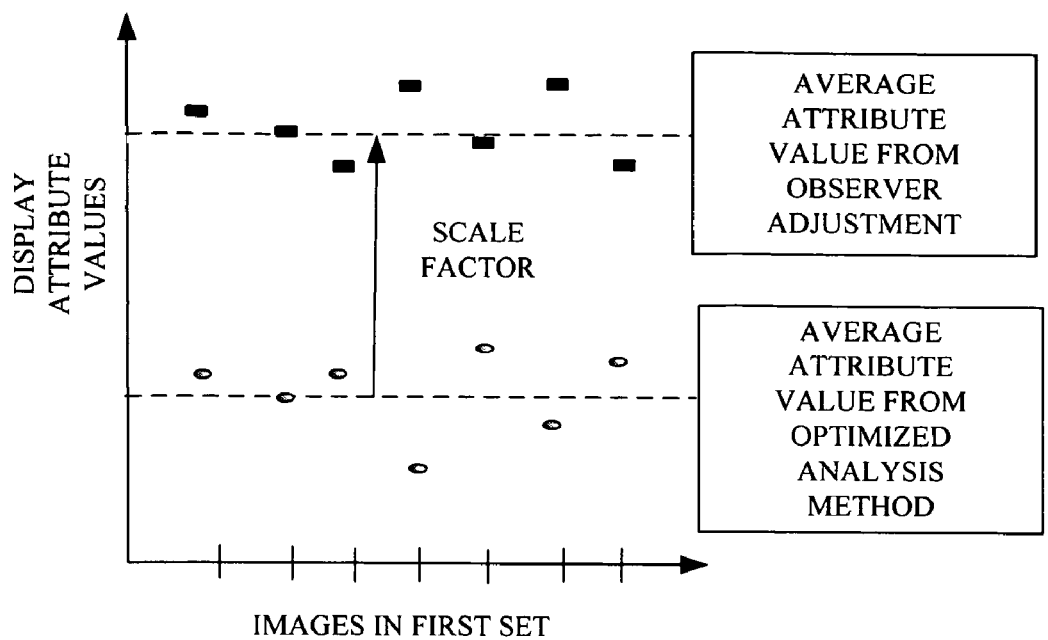
FIG. 7 is a diagram illustrating the relationship between display attribute values, scale factor, and images in first set.

In action 216, a scaling factor is determined from the observed settings and the formulated settings. The scaling factor would be a unique value or a set of values that mathematically expresses the relationship of the desired settings and the formulated settings. As shown graphically in FIG. 7, display attribute values (Y Axis) and images in first set (X Axis), the scale factor pushes average attribute value from optimized analysis method up to the average attribute value from observer adjustment. Once the scale factor has been determined control is passed action 218 to save scaling factor 218 in a storage device.

Action 218 saves the scaling factor in a storage device. For immediate use the scaling factor is saved in RAM 406 and for permanent storage in mass storage 410 or any suitable storage that may be coupled to computer 402. The saved scaling factor 218 shifts the determined $W_{\_L}$ and $W_{\_W\, curves}$ from their respective original position to the desired setting of the observer. See FIG. 7. When the optimized parameters are processed by display terminal 422 the brightness and contrast ($W_{\_L}$ and $W_{\_W}$) will correspond to the desired settings of the observers.

Figure 3:
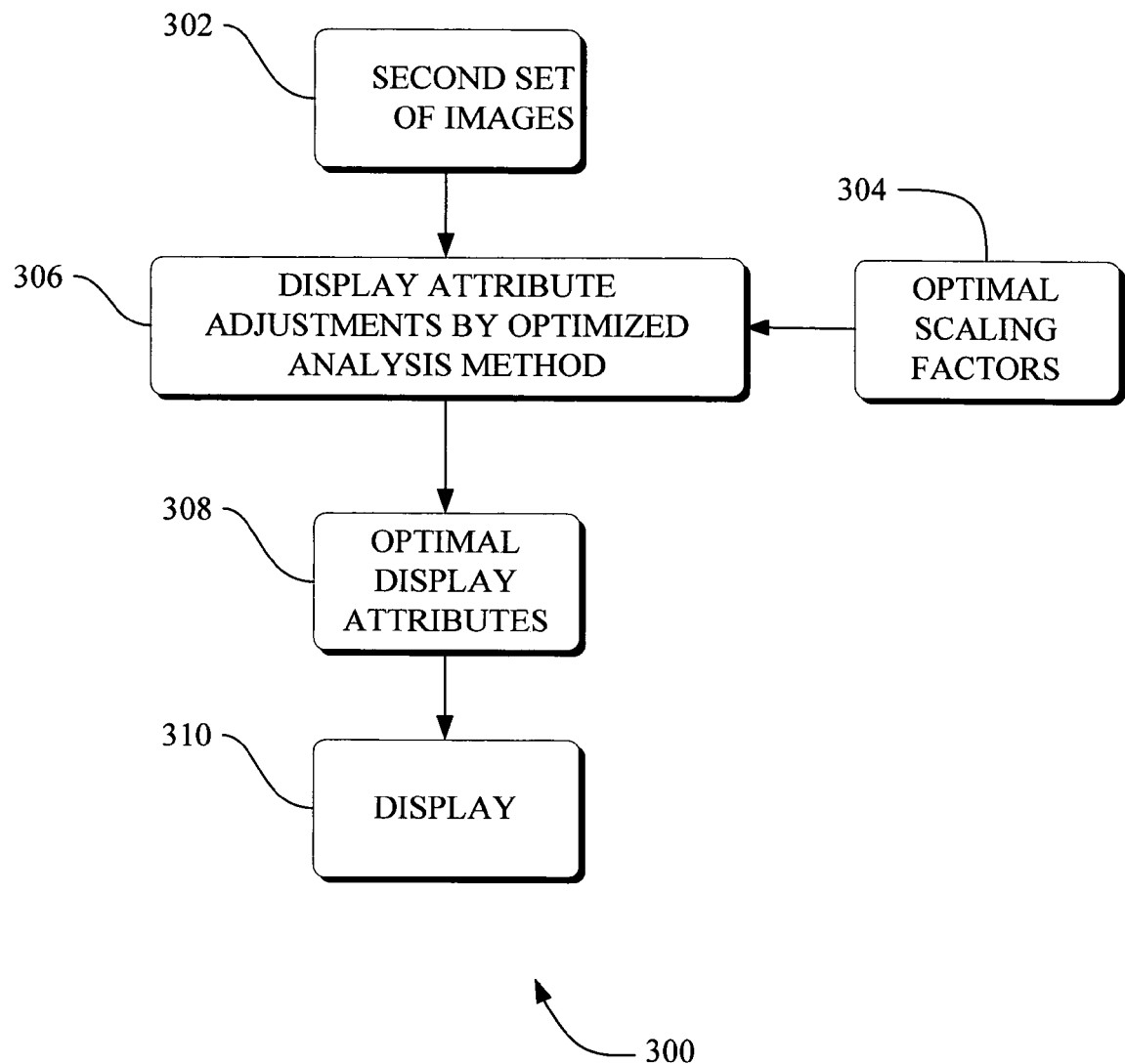
FIG. 3 is a flowchart of a method performed by a client according to an embodiment for applying attribute adjustments when displaying images.

FIG. 3 is a flowchart of a method 300 performed by a client according to an embodiment. Method 300 meets the need in the art for selection of window width and window level with minimal user interaction. Method 300 is applies the determined scaling factor to a second set of images having similar characteristics such as same imaging site (hospital), same anatomy and view, and same processing type.

Figure 8:
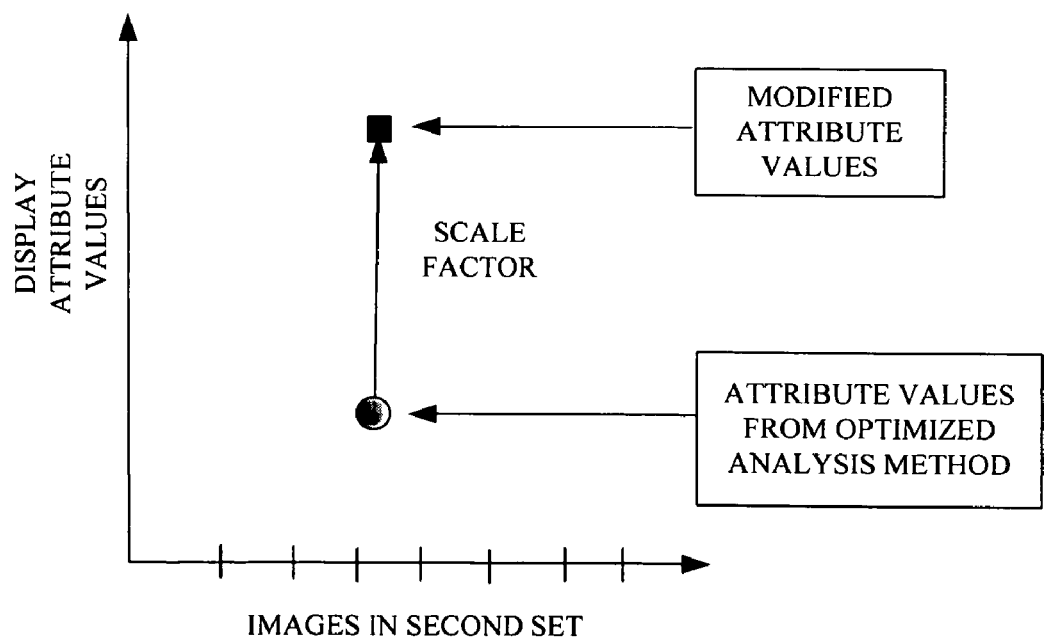
FIG. 8 is a diagram illustrating the relationship between attribute values from optimized analysis method and modified attribute values.

Method 300 begins with action 302 of selection of the image data set based on the same imaging site, processing type, etcetera to form a second set of images. The second set of images 302 and the scaling optimal scaling factor 304 are used by optimized analysis method (method 200) 306 to derive display attribute adjustments. The optimal display attributes 308 are processed at a display terminal (e.g., display 422) 310 to select the window width and the window level with minimal user interaction. The contribution of the scale factor is shown in FIG. 8 when the attribute values from optimized analysis method are mapped to modified attribute values.

Figure 4:
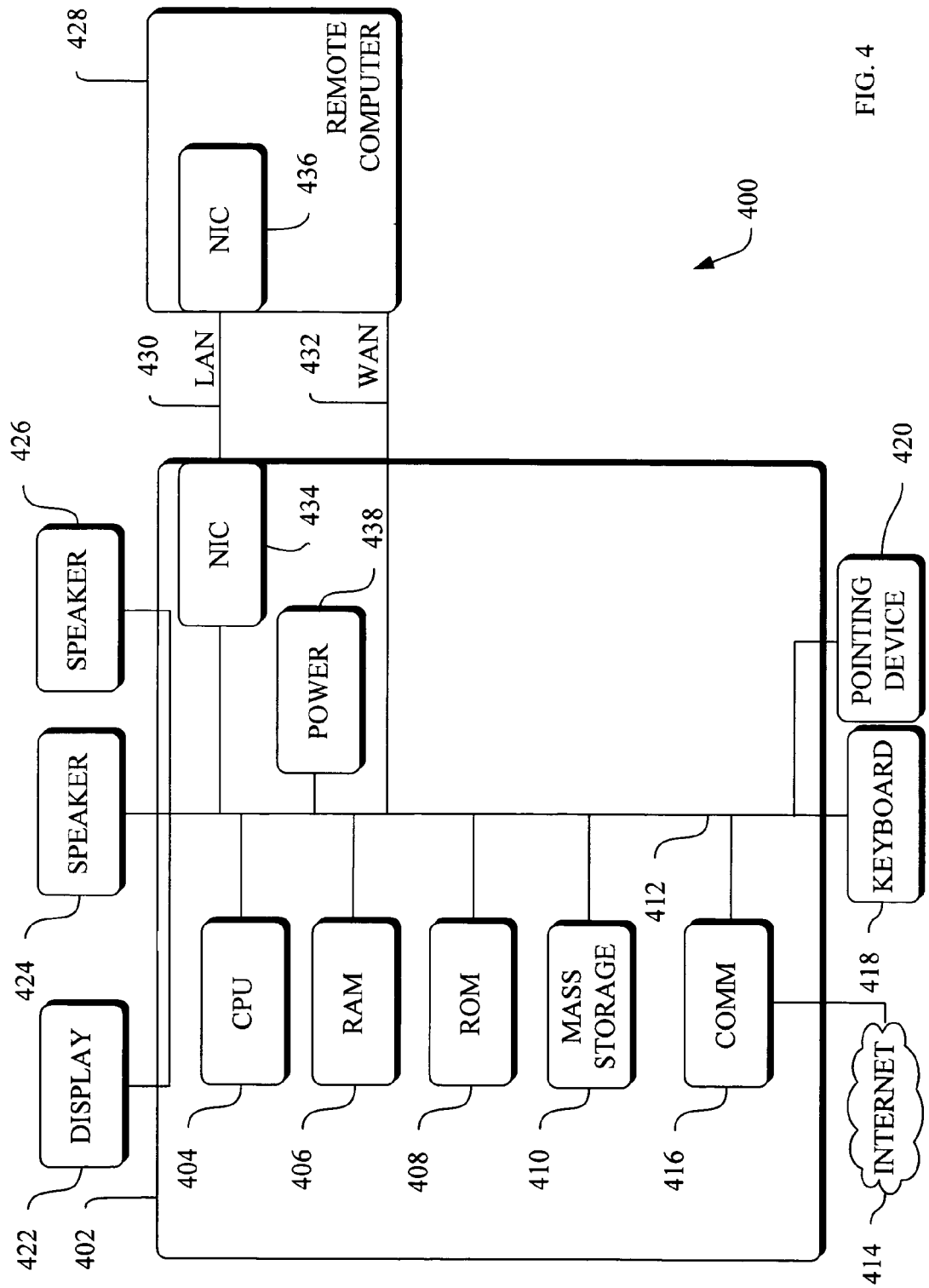
FIG. 4 is a block diagram of the hardware and operating environment in which different embodiments can be practiced.

FIG. 4 is a block diagram of the hardware and operating environment 400 in which different embodiments can be practiced. The description of FIG. 4 provides an overview of computer hardware and a suitable computing environment in conjunction with which some embodiments can be implemented. Embodiments are described in terms of a computer executing computer-executable instructions. However, some embodiments can be implemented entirely in computer hardware in which the computer-executable instructions are implemented in read-only memory. Some embodiments can also be implemented in client/server computing environments where remote devices that perform tasks are linked through a communications network. Program modules can be located in both local and remote memory storage devices in a distributed computing environment.

Computer 402 includes a processor 404, commercially available from Intel, Motorola, Cyrix and others. Computer 402 also includes random-access memory (RAM) 406, read-only memory (ROM) 408, and one or more mass storage devices 410, and a system bus 412, that operatively couples various system components to the processing unit 404. The memory 406, 408, and mass storage devices, 410, are types of computer-accessible media. Mass storage devices 410 are more specifically types of nonvolatile computer-accessible media and can include one or more hard disk drives, floppy disk drives, optical disk drives, and tape cartridge drives. The processor 404 executes computer programs stored on the computer-accessible media.

Computer 402 can be communicatively connected to the Internet 414 via a communication device 416. Internet 414 connectivity is well known within the art. In one embodiment, a communication device 416 is a modem that responds to communication drivers to connect to the Internet via what is known in the art as a "dial-up connection." In another embodiment, a communication device 416 is an Ethernet® or similar hardware network card connected to a local-area network (LAN) that itself is connected to the Internet via what is known in the art as a "direct connection" (e.g., T1 line, etc.).

A user enters commands and information into the computer 402 through input devices such as a keyboard 418 or a pointing device 420. The keyboard 418 permits entry of textual information into computer 402, as known within the art, and embodiments are not limited to any particular type of keyboard. Pointing device 420 permits the control of the screen pointer provided by a graphical user interface (GUI) of operating systems such as versions of Microsoft Windows®. Embodiments are not limited to any particular pointing device 420. Such pointing devices include mice, touch pads, trackballs, remote controls and point sticks. Other input devices (not shown) can include a microphone, joystick, game pad, satellite dish, scanner, or the like.

In some embodiments, computer 402 is operatively coupled to a display device 422. Display device 422 is connected to the system bus 412. Display device 422 permits the display of information, including computer, video and other information, for viewing by a user of the computer. Embodiments are not limited to any particular display device 422. Such display devices include cathode ray tube (CRT) displays (monitors), as well as flat panel displays such as liquid crystal displays (LCD's). In addition to a monitor, computers typically include other peripheral input/output devices such as printers (not shown). Speakers 424 and 426 provide audio output of signals. Speakers 424 and 426 are also connected to the system bus 412.

Computer 402 also includes an operating system (not shown) that is stored on the computer-accessible media RAM 406, ROM 408, and mass storage device 410, and is and executed by the processor 404. Examples of operating systems include Microsoft Windows®, Apple MacOS®, Linux®, UNIX®. Examples are not limited to any particular operating system, however, and the construction and use of such operating systems are well known within the art.

Embodiments of computer 402 are not limited to any type of computer 402. In varying embodiments, computer 402 comprises a PC-compatible computer, a MacOS®-compatible computer, a Linux®-compatible computer, or a UNIX®-compatible computer. The construction and operation of such computers are well known within the art.

Computer 402 can be operated using at least one operating system to provide a graphical user interface (GUI) including a user-controllable pointer. Computer 402 can have at least one web browser application program executing within at least one operating system, to permit users of computer 402 to access intranet or Internet world-wide-web pages as addressed by Universal Resource Locator (URL) addresses. Examples of browser application programs include Netscape Navigator® and Microsoft Internet Explorer®.

The computer 402 can operate in a networked environment using logical connections to one or more remote computers, a digital library, a database, a website, or any other information repository. The digital repository may be an "off-the-shelf" software product such as an Oracle database software developed and sold by Oracle Corporation of Redwood City, Calif.

In action 504 clinical images from the image warehouse are categorized in accordance to imaging site, processing type, anatomy and view, or any other form of categorization of clinical images. Table I is an example of a categorization based on an embodiment having the category labels in the first row.

TABLE I

Image Categorization

| Image Set | Anatomy and View | Tissue Thickness | Imaging Site | Patient Age | Processing Type | Number of Images |
|---|---|---|---|---|---|---|
| 1 | Hand PA | Thin | Site A | Pediatric | Custom 4 | 14 |
| 2 | Hand PA | Thin | Site A | Adult | Custom 4 | 25 |
| 3 | C-spine Lateral | Thin | Site A | Adult | Custom 2 | 38 |
| 4 | Chest PA | Medium | Site A | Pediatric | Custom 4 | 12 |
| 5 | Chest PA | Medium | Site A | Adult | Custom 4 | 21 |
| 6 | Chest PA | Medium | Site B | Adult | Custom site B | 49 |
| 7 | Chest Lateral | Thick | Site A | Pediatric | Custom 4 | 11 |
| 8 | Chest Lateral | Thick | Site A | Adult | Custom 4 | 14 |
| 9 | Chest Lateral | Thick | Site B | Adult | Custom site B | 40 | such as remote computer 428. These logical connections are achieved by a communication device coupled to, or a part of, the computer 402. Embodiments are not limited to a particular type of communications device. The remote computer 428 can be another computer, a server, a router, a network PC, a client, a peer device or other common network node. The logical connections depicted in FIG. 4 include a local-area network (LAN) 430 and a wide-area network (WAN) 432. Such networking environments are commonplace in offices, enterprise-wide computer networks, intranets and the Internet.

When used in a LAN-networking environment, the computer 402 and remote computer 428 are connected to the local network 430 through network interfaces or adapters 434, which is one type of communications device 416. Remote computer 428 also includes a network device 436. When used in a conventional WAN-networking environment, the computer 402 and remote computer 428 communicate with a WAN 432 through modems (not shown). The modem, which can be internal or external, is connected to the system bus 412. In a networked environment, program modules depicted relative to the computer 402, or portions thereof, can be stored in the remote computer 428.

Computer 402 also includes power supply 438. Each power supply can be a battery.

Figure 5:
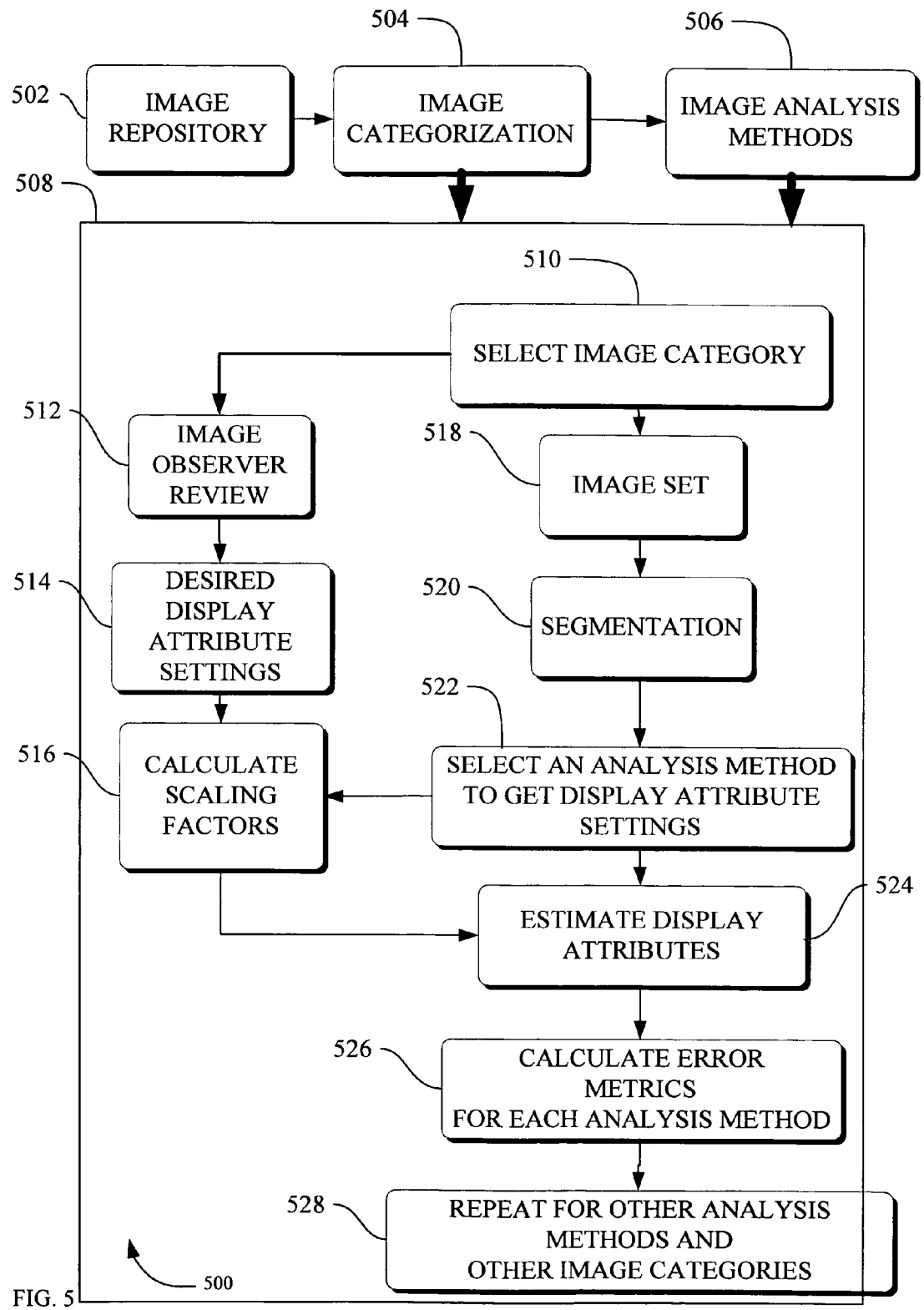
FIG. 5 is part of a flowchart of a method performed by a client according to an embodiment for categorizing and selecting images for an observer to review and for estimating attributes.

FIG. 5 is a flowchart of a method 500 performed by a client according to an embodiment. Method 500 meets the need in the art for selection of window width and window level with minimal user interaction.

Method 500 begins in action 502 by downloading images from an image warehouse or digital repository. This collection is a dataset of images that are used to derive scaling factors for achieving image consistency on the desired display terminal. The source digital repository stores various images that are available for retrieval. This repository can be After the images have been categorized, an analysis is performed to derive optimal set of scaling factors 508 based on a particular image analysis method 506.

The derivation of optimal set of scaling factors begins with action 510. In action 510 and image category is selected. Examples of an image category would be imaging site, anatomy and view, and processing type. After selecting the image category 510 an image set 518 is selected for analysis. The selected image category with the appropriate image set is subjected to segmentation analysis 520. After the image set 518 has been segmented 520 an analysis method is selected to get display attribute settings 522 for the image set.

Image segmentation refers to the removal of unwanted portions of an image. Apart from the pixels corresponding to the body part being imaged, an x-ray image also has a considerable number of pixels belonging to the raw radiation and pixels corresponding to the collimator edges. If the window settings are determined by evaluating all the pixel values in image matrix including those corresponding to raw radiation and collimation edges. The resulting image brightness and contrast may not be satisfactory because the selected $WW_{-L}$ and $WW_{-W}$ will include these undesired image pixels. This is especially true for the images of body parts such as hand, which generally have a large area corresponding to raw radiation, and hence large number of pixels considered for analysis will be undesired.

In action 522, a formulation of window level (WL) and window width (WW) by use of mathematical techniques such as histogramming. For example, in determining window level the mean of a selected range such $90^{th}$-$10^{th}$ percentile. The difference between the selected range could be used to determine window width. The formulation of window level (WL) and window width (WW) are the default display attribute settings 522 while the observer window settings are the desired display attribute settings 514.

In actions 512 and 514, the display attribute settings are obtained from the observer reviewer. The observer is one or more consumer of the images that will provide settings for brightness and contrast for a set of images at a display terminal. The observer reviews all the images from a particular image set simultaneously and adjusts the window level and window width for the particular image set to achieve a consistent appearance across all the images in that image set and not for the best image appearance for any individual image. For example, using the expertise of two domain experts for this purpose both observers review the images and adjust the $WW_{\_L}$ and $WW_{\_W}$ independently producing two sets of consistent window settings for each image set. These display attribute settings 514 are referred to as the desired display attribute settings (gold standard) for that image set.

In action 516 scaling factors are calculated. The scaling factors are used to adjust the default display attribute settings (action 522) to match the desired window settings (action 514) for consistency. For each image set, brightness scaling factor (Badj) and contrast scaling factor (Cadj) is determined for WL and WW adjustments respectively. Thus, for each image set the scaling factors tuned the window settings of each set according to the overall preferred image appearance for that particular image set obtained by the observer. Mathematically the adjustments can be expressed as:

$$Badj = \frac{\text{mean of the desired } WL \text{ for the particular image set}}{\text{mean of the formulated } WL \text{ for that set}};$$

$$Cadj = \frac{\text{mean of the desired } WW \text{ for a particular image set}}{\text{mean of formulaed } WW \text{ for that set}}$$

In action 524 estimate display attribute for window width (WW) and window level (WL) are determined from the scaling factors 516 and the formulated, WL_f and WW_f, display attribute settings 522 for selected image category. Mathematical this can be expressed as: WL_est=WL_f*Badj; WW_est=WW_f*Cadj.

In action 526, error metrics for window width (E_ww) and window level (E_wl) are calculated. E_wl provided a cumulative error over all the images in an image set by calculating the deviation between estimated and desired window level for each image in that set. The mathematical representation for this error is:

$$E\_wl = \sqrt{\left( \frac{\sum_{i=1}^{N} \left( \frac{Badj * WL\_f(i)}{WL\_d(i)} - 1 \right)^2}{N} \right)}$$

Where N is the total number of images in the particular set; WL_f is the formulated WL;

WL_d is the corresponding WL value set by observer; and Badj is the brightness adjustment factor.

E_ww generated an aggregate mismatch error between estimated and desired window width over all the images in an image set. The mathematical representation for this error is:

$$E\_ww = \sqrt{\left( \frac{\sum_{i=1}^{N} \left( \frac{Cadj * WW\_f(i)}{WW\_d(i)} - 1 \right)^2}{N} \right)}$$

Where N is the total number of images in the particular set; WW_f is the formulated WW; WW_d is the corresponding value of WW set by observer.; and Cadj is the contrast adjustment factor.

In action 528, actions 510-526 are repeated for other analysis methods and other image categories. However, at a minimum other analysis methods are different combinations of image histogram statistics used to predict new window settings or calculated window settings. These image histograms are obtained from the segmented images that have portions like raw radiations and collimation edges removed.

Figure 6:
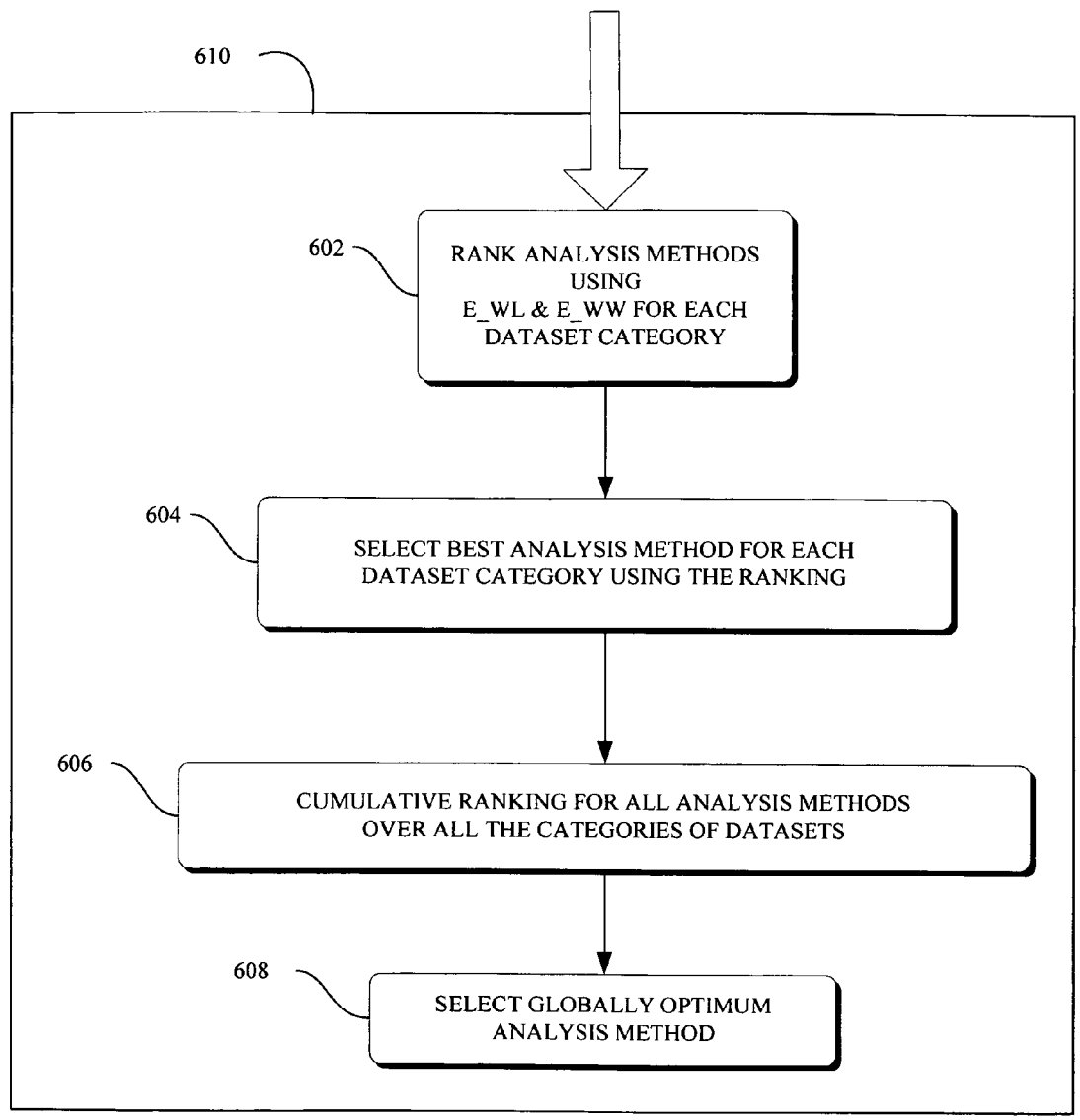
FIG. 6 is part of a flowchart of a method performed by a client according to an embodiment for selecting analysis method for dataset category.

FIG. 6 is a flowchart of a method 600 performed by a client according to an embodiment. Method 600 is ranking and selecting best analysis method for the image dataset 610. Method 600 meets the need in the art for selection of window width and window level with minimal user interaction.

Method 600 begins with action 602. In action 602 the WL and WW estimations are ranked by using E_wl and E_ww for each dataset category as shown in Table I. Each WL and WW candidate analysis was evaluated over a dataset to select the best estimation analysis for that dataset. Each dataset consists of nine (9) image sets as shown in TABLE I. The ranking is carried out using E_wl for window length estimation analysis and E_ww for window width estimation analysis. For a selected dataset, each candidate analysis was ranked considering a single image set at a time such that the technique with the minimum error receives the highest ranking. For each image in the set the window settings were adjusted by four different methods such as same image with default window settings, with the two optimum estimation analysis methods and with the analysis method giving best results for that image set. The ten images are arranged in a single column based on the window settings. That is, there is a column with a default window setting, a column with giving the best result window setting, etcetera. The observer (two observers) reviews the images and rates the consistency along each column. Each column represents the consistency of an image set when window settings are adjusted with a specific analysis method. An example rating is a scale 0 to 4. Where zero (0) corresponding to highly inconsistent image appearance while four (4) is very consistent image appearance. Each observer evaluates and rates the results independently by comparing the consistency across the rows. Since each column represents a different estimation analysis method, when an observer a preference for an image in a given row it is selecting the best analysis method for that image set. In this way the selection of each observer becomes the best technique and the window settings (brightness and contrast) that should be used by the system to automate the selection of window width and window level with minimal user interaction In action 604, the best category technique is selected. This is accomplished by mean ranking for each technique over all the nine images sets producing nine rankings for each dataset. An array of five best estimation techniques, with the highest mean rankings, was selected for each dataset.

In action 606, cumulative ranking is performed. While action 608 selects the best technique for dataset based on the cumulative ranking. Cumulative ranking is the globally optimum technique from the arrays of best estimation techniques corresponding to each dataset. The technique with the highest cumulative ranking was the globally optimum estimation technique.

In some embodiments, the methods are implemented as a computer data signal embodied in a carrier wave, that represents a sequence of instructions which, when executed by a processor, such as processor 404 in FIG. 4, cause the processor to perform the respective method. In other embodiments, the methods are implemented as a computer-accessible medium having executable instructions capable of directing a processor, such as processor 404 in FIG. 4, to perform the respective method. In varying embodiments, the medium is a magnetic medium, an electronic medium, or an optical medium.

Components for image processing, and methods for determining optimal scaling factor and optimal display attributes can be embodied as computer hardware circuitry or as a computer-readable program, or a combination of both.

More specifically, in the computer-readable program embodiment, the programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (API) or inter-process communication techniques such as remote procedure call (RPC), common object request broker architecture (CORBA), Component Object Model (COM), Distributed Component Object Model (DCOM), Distributed System Object Model (DSOM) and Remote Method Invocation (RMI). The components execute on as few as one computer as in computer 306 in FIG. 4, or on at least as many computers as there are components.

The image warehouse is one or more collection of images, image repository, or a series of images that have been received from an imaging system. The images are then stored in a storage device for easy access by the image processor 402 and display terminal 422. The image processor is an aptly programmed general-purpose computer that is capable of implementing the above methods. These methods are embodied in a memory device and use with computed scale factors 110 to shift the determined brightness and contrast of an image to the desired settings for the observer without the need of human interaction. The scale factor in addition to the adjustment data can have a unique code that identifies the observer, a department in a medical institution, or any other categorization that can be uniquely defined. The images are displayed at terminal 312 to be view by an observer after they have been received and processed in accordance to optimizing algorithm in image processor 402.

Conclusion

A system and method has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations. For example, although described in object-oriented terms, one of ordinary skill in the art will appreciate that implementations can be made in a procedural design environment or any other design environment that provides the required relationships.

In particular, one of skill in the art will readily appreciate that the names of the methods and apparatus are not intended to limit embodiments. Furthermore, additional methods and apparatus can be added to the components, functions can be rearranged among the components, and new components to correspond to future enhancements and physical devices used in embodiments can be introduced without departing from the scope of embodiments. One of skill in the art will readily recognize that embodiments are applicable to future communication devices, different file systems, and new data types.

We claim:

1. A method for optimizing visual consistency for a set of images in an image dataset comprising:
    displaying a set of images to an observer so as to select display attributes for the displayed set of images;
    receiving a set of image display attributes from the observer, wherein the observer manually tuned the image display attributes to make the set of images visually consistent;
    determining a range of pixel values for the set of images, wherein determining the range of pixel values further comprises segmenting the set of images and performing a histogram analysis on the segmented images;
    deriving an optimal set of image display attributes from the received image display attributes of the observer and from the determined range of pixel values; and
    displaying one or more images with the derived optimal set of image display attributes on a display device.

2. The method of claim 1, wherein the received set of image display attributes comprises at least a selected window setting.

3. The method of claim 2, wherein the selected window setting determines brightness and contrast level.

4. The method of claim 1, further comprising:
    averaging the determined range of pixel values.

5. The method of claim l, wherein displaying the set of images to the observer further comprises:
    displaying simultaneously all of the images of a particular dataset of a particular imaging site of the set of images to the observer.

6. The method of claim 1, wherein the deriving set of image display attributes further comprises:
    deriving a first set of attribute values from observer adjustments of the one or more set of images;
    deriving a second set of attribute values from the determined range of pixel values for the one or more set of images;
    calculating a scaling factor based on the first set of attribute values and the second set of attribute values; and
    applying the calculated scaling factor to attribute values derived from the analysis of the second set of images.

7. A computerized method for automatically modifying the rendering of images to meet a preference of at least one expert observer for a rendered image comprising:
    receiving one or more digital images, wherein the one or more digital images has a set of image display attributes;
    determining a range of pixel values for the received one or more digital images;
    selecting from the received one or more digital images and the determined range of pixel values at least one scaling factor defining the preference of the at least one expert observer for rendered images, wherein the at least one scaling factor is a function of at least one of image display attributes;
    mapping display attributes of the one or more digital images through the at least one scaling factor to produce one or more output images having the preference of the at least one expert observer for rendered images; and displaying the output image on a display terminal based on the mapping of the image display attributes through the scaling factor.

8. The computerized method of claim 7, the method further comprising:
receiving a unique code for associating the preference of the at least one expert observer and the selected scaling factor defining the preference of the expert observer for rendered images.

9. The computerized method of claim 7, wherein the one or more digital images can be categorized into one or more anatomy and view, tissue thickness, imaging production site, patient attributes, processing type.

10. The computerized method of claim 9, wherein the mapping of the received one or more digital images is selecting for each category an estimated window width and an estimated window length.

11. The computerized method of claim 9, wherein the mapping of the received one or more digital images is selecting an estimated window width and an estimated window length that is applicable across all the categories.

12. A computer storage medium having executable instructions for optimizing visual consistency for a set of images in an image dataset, the executable instructions capable of directing a processor to perform:
displaying a set of images to an observer;
receiving a set of image display attributes from the observer, wherein the observer manually tuned the image display attributes to make images visually consistent;
determining a range of pixel values of the set of images;
averaging the pixel values of the set of images;
deriving an optimal set of image display attributes from the received image display attributes of the observer and the average pixel values of the determined range of pixel values; and
displaying one or more images with the derived optimal set of image display attributes on a display device.

13. The computer storage medium of claim 12, wherein the deriving further comprises:
deriving a first set of attribute values from observer adjustments of the first set of images;
deriving a second set of attribute values from an optimized analysis method of the first set of images;
calculating a scaling factor based on the first set of attribute values and the second set of attribute values; and
applying the calculated scaling factor to attribute values derived from the analysis of the second set of images.

14. The computer storage medium of claim 13, wherein the attribute is one of window width and window level.

15. The computer storage medium of claim 13, wherein the optimized analysis method uses at least one of image segmentation and image histogram characterization.

16. The computer storage medium of claim 14, wherein the optimized analysis method comprises:
applying one or more analysis method to derive a set of attribute values;
scaling the derived set of attributes from the analysis method to the attributes from observer adjustment;
computing an error metric; and
selecting an applied analysis method with the minimum error metric as the optimal analysis method.

17. The computer storage medium of claim 13, wherein the optimized analysis method further comprises:
segmenting each of the set of images, yielding a set of segmented images; and
performing histogram analysis on the segmented images.

18. The computer storage medium of claim 12, wherein displaying the set of images to the observer further comprises:
displaying simultaneously all of the images of a particular dataset of the set of images to the observer.

19. The computer storage medium of claim 12, wherein the observer further comprises:
an expert observer.

* * * * *